US008599000B2

(12) United States Patent
Lewis

(10) Patent No.: US 8,599,000 B2
(45) Date of Patent: Dec. 3, 2013

(54) OVER-THE-AIR ISSUE REPORTING FROM VEHICLES

(75) Inventor: Derek Lane Lewis, Ida, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 430 days.

(21) Appl. No.: 12/953,967

(22) Filed: Nov. 24, 2010

(65) Prior Publication Data

US 2012/0126963 A1 May 24, 2012

(51) Int. Cl.
*B60Q 1/00* (2006.01)

(52) U.S. Cl.
USPC .......... 340/425.5

(58) Field of Classification Search
USPC .......... 340/425.5, 426.15, 426.16, 426.2, 340/426.25; 701/29.1
See application file for complete search history.

(56) References Cited

U.S. PATENT DOCUMENTS

| | | | | |
|---|---|---|---|---|
| 6,181,994 | B1 | 1/2001 | Colson et al. | |
| 6,330,499 | B1 | 12/2001 | Chou et al. | |
| 6,553,292 | B2 | 4/2003 | Kokes et al. | |
| 6,678,591 | B2 * | 1/2004 | Ohmura et al. | 701/31.4 |
| 6,701,232 | B2 | 3/2004 | Yamaki | |
| 6,751,452 | B1 | 6/2004 | Kupczyk et al. | |
| 7,212,893 | B2 | 5/2007 | Doherty et | |
| 7,280,900 | B2 | 10/2007 | Gault et al. | |
| 7,324,803 | B2 | 1/2008 | Moyes | |
| 7,593,999 | B2 | 9/2009 | Nathanson | |
| 7,634,298 | B2 | 12/2009 | Kaplan | |
| 7,711,462 | B2 * | 5/2010 | Daniels et al. | 701/31.4 |
| 8,145,379 | B2 * | 3/2012 | Schwinke | 701/33.2 |
| 2002/0091540 | A1 | 7/2002 | Stumne et al. | |
| 2006/0142902 | A1 | 6/2006 | Hohl et al. | |
| 2006/0247832 | A1 * | 11/2006 | Taki | 701/33 |
| 2007/0093947 | A1 * | 4/2007 | Gould et al. | 701/29 |

* cited by examiner

*Primary Examiner* — Phung Nguyen
(74) *Attorney, Agent, or Firm* — Dinsmore & Shohl LLP

(57) ABSTRACT

Systems and methods for occupant reporting of a vehicle issue over-the-air from within a vehicle include a cellular device in the vehicle that establishes a connection with a cellular network. A user interface includes a display that provides occupant selectable menu options for reporting a vehicle issue. A processing system generates issue data based on a selected menu option. The issue data is selectably provided to one or more issue receiving servers including a first issue receiving server associated with a first organization and a second issue receiving server associated with a second, different organization using the cellular network.

14 Claims, 4 Drawing Sheets

OVER-THE-AIR ISSUE REPORTING FROM VEHICLES

TECHNICAL FIELD

The present specification generally relates to over-the-air issue reporting from vehicles.

BACKGROUND

Many vehicle diagnostic systems provide the ability to contact a human advisor regarding a vehicle issue. The advisor may then assist the vehicle operator with the issue by providing instructions or advise. Vehicle telematics may be typically employed to connect to the advisor from within the vehicle. The telematics may be used to establish direct voice contact with the advisor using a built-in microphone, cellular antenna in the vehicle and cellular network.

SUMMARY

In one embodiment, a system for occupant reporting of a vehicle issue over-the-air from within a vehicle includes a cellular device in the vehicle that establishes a connection with a cellular network. A user interface includes a display that provides occupant selectable menu options for reporting a vehicle issue. A processing system generates issue data based on a selected menu option. The issue data is selectably provided to one or more issue receiving servers including a first issue receiving server associated with a first organization and a second issue receiving server associated with a second, different organization using the cellular network.

In another embodiment, a method for occupant reporting of a vehicle issue over-the-air from within a vehicle comprises: establishing a connection with a cellular network using a cellular device in a vehicle; selecting an issue menu option provided on a display of a user interface; generating issue data based on the selected issue menu option; and selectably providing the issue data to one or more issue receiving servers including a first issue receiving server associated with a first organization and a second issue receiving server associated with a second, different organization using the cellular network.

In another embodiment, a system for occupant reporting of a vehicle issue over-the-air from within a vehicle includes a cellular device in the vehicle that establishes a connection with a cellular network. A user interface includes a display that provides an issue reporting screen where, upon occupant actuation of an issue reporting element, the issue reporting screen provides selectable menu options for reporting a vehicle issue. A processing system generates issue data based on a selected menu option. The issue data is provided to an issue receiving server using the cellular network.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein generally relate to over-the-air (OTA) reporting of vehicle issues. The OTA reporting systems and methods may utilize a data communications module (DCM) in the vehicle that provides a connection to various databases for collecting issue data, for example, through a cellular network. The DCM may provide issue data to the databases OTA (e.g., without contacting a human advisor to provide the issue data).

Figure 1:
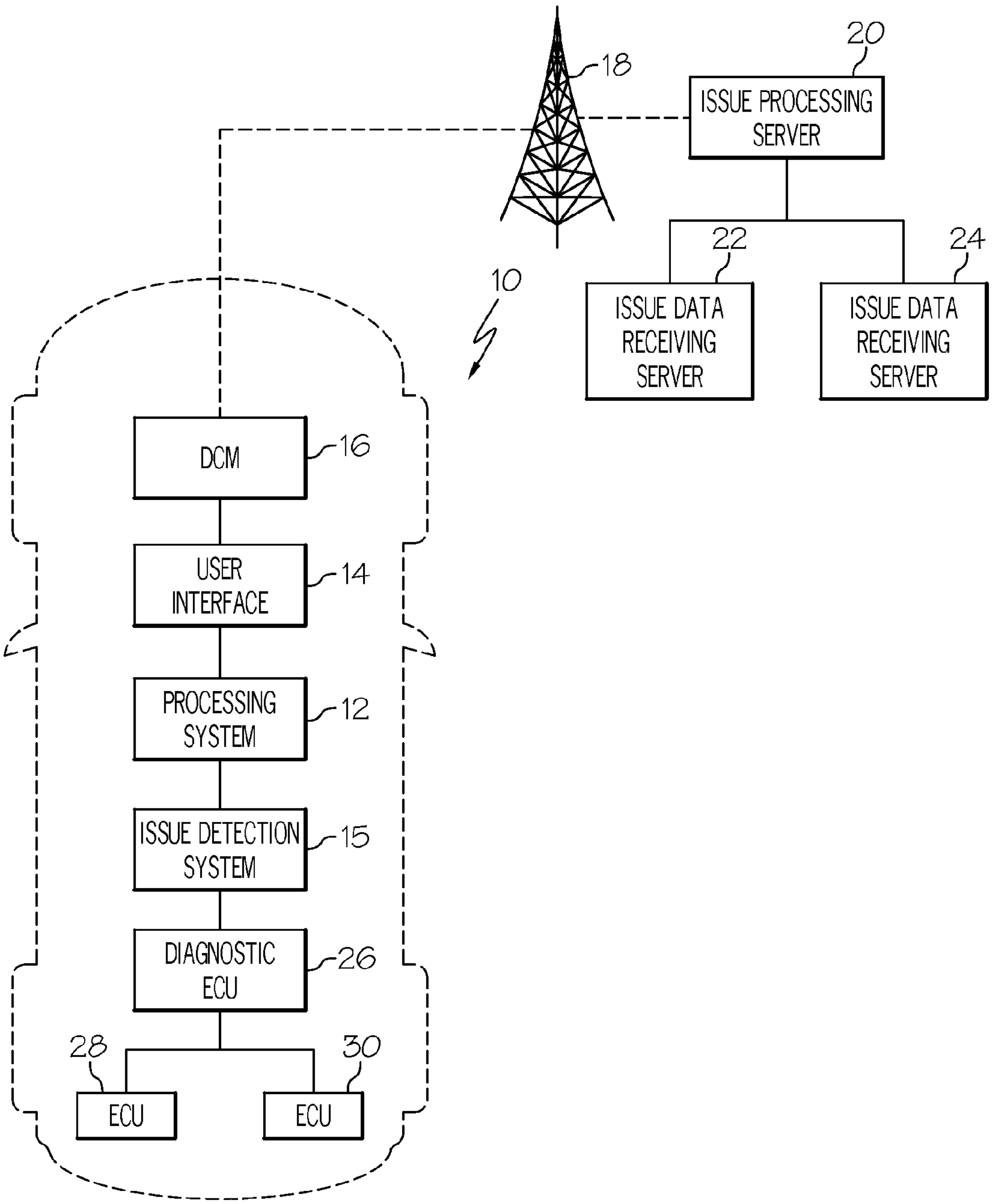
FIG. 1 is a diagrammatic view of an over-the-air reporting system for a vehicle according to one or more embodiments shown and described herein.

Referring to FIG. 1, a vehicle 10 (represented by dotted lines) may include a processing system 12, a user interface 14 and an issue detection system 15 capable of providing issue information to the processing system 12. A DCM 16 may be provided that is capable of OTA communication via a cellular network 18. The DCM 16 may provide a connection with an issue processing server 20 that can receive issue data from the DCM 16. The issue processing server 20 may then provide the issue data to one or more issue data receiving servers 22 and 24, as will be described in greater detail below. One or more of the issue data receiving servers 22 and 24 may provide a website including one or more webpages that include a form that receives the issue data to allow for saving, viewing and/or processing of the issue data at a location remote from the vehicle 10.

The issue detection system 15 may be any type of system that detects a vehicle issue. The issue detection system 15 may provide the issue information to the processing system 12 for processing the issue information, generating issue data that can be provided to the DCM 16 and/or be used to generate selectable options provided to the vehicle occupant via the user interface 14. The issue detection system 15 may, for example, include one or more sensors or accelerometers mounted on the vehicle 10 at one or more strategic locations, such as at the bumpers and/or sides of the vehicle 10. The issue detection system 15 may include one or more sensors that detect deployment of an air bag and/or detect low tire pressure. The issue detection system 15 may include a diagnostic electronic control unit 26 (ECU) that receives information from any of a number of vehicle ECUs 28 and 30. As used herein, a vehicle ECU refers to any embedded system that controls one or more of the electrical systems or subsystems in a motor vehicle. Exemplary vehicle ECUs include Airbag Control Units (ACU), Body Control Modules that control door locks, electric windows, courtesy lights, etc., Convenience Control Units (CCU), Door Control Units, Engine Control Units (ECU), Man Machine Interfaces (MMI), On-Board Diagnostics (OBD), Powertrain Control Modules (PCM), Seat Control Units, Speed Control Units, Telephone Control Units (TCU) that dial the telephone, Transmission Control Units (TCU), and the like. In addition to providing information, the diagnostic ECU may also reprogram or provide updates to the vehicle ECUs.

Figure 2:
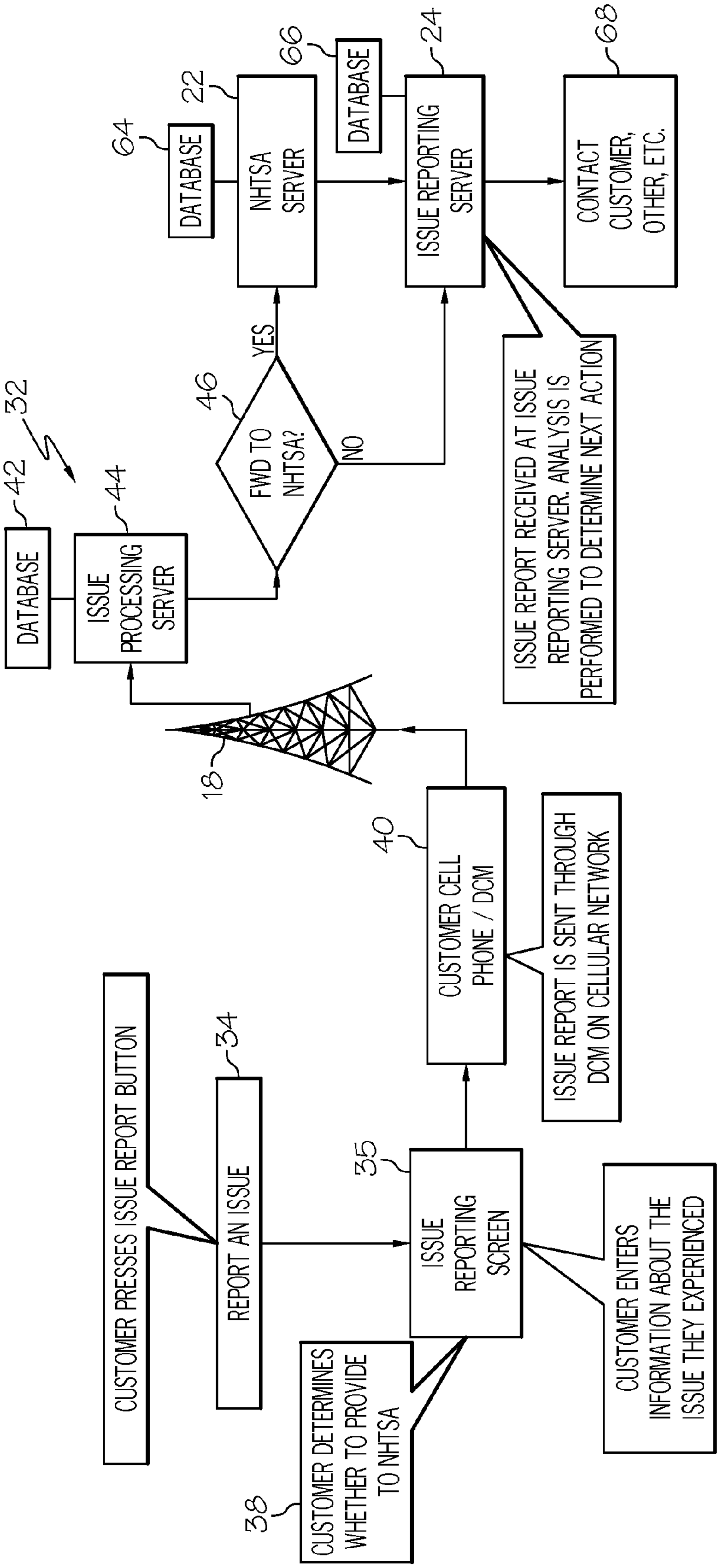
FIG. 2 illustrates a system and method of over-the-air reporting from a vehicle using a data communications module according to one or more embodiments shown and described herein.

In some embodiments, the vehicle occupant may generate the issue data using the user interface 14. Referring to FIG. 2, an exemplary system and method 32 for providing issue data OTA to a remote location is provided. At step 34, the vehicle occupant decides to report a vehicle issue and actuates an Issue Report Button or other issue reporting element provided by the user interface 14. The user interface 14 may include any suitable display device, such as, for example, LCD display devices, LED display devices, OLED display devices, and other types of display devices which may be heretofore developed. Further, the display device may be any other variety of indicators, including, but not limited to a series of lights and/or other types of light devices as opposed to a single integrated display screen. The Issue Report Button may be manually actuated, such as by pressing the Issue Report Button. The Issue Report Button may comprise one or more touch sensors (e.g., resistive or capacitive touch sensors, surface acoustic wave sensors, infrared LED, photodetectors, piezoelectric transducers, etc.) that can be actuated by placing and/or pressing a tip of the finger within the button area. In these embodiments, the Issue Report Button may not move. Instead, the Issue Report Button may be indicated visually to identify where to place the finger. In other embodiments utilizing touch sensors, the Issue Report Button may move, for example, to bring the finger or touching device into close proximity to the touch sensor. In some embodiments, the user interface 14 may provide other button or input types such as an OK button and/or joy stick/track ball, which a user may utilize to navigate through a software driven menu provided on the user interface 14. Additional buttons may be used as shortcut buttons, for example, to call up a certain program, as a method of scrolling, to select items from a list, or to provide any function that the software designer of the user interface 14 may assign to the button or set of buttons. Each button size, layout, location, and function may vary.

Once the vehicle occupant initiates vehicle issue reporting at step 34, an Issue Reporting Screen may be displayed by the user interface 14 at step 35. In some embodiments, one or more selectable issue categories (e.g., in the form of selectable buttons) may be displayed as a menu. Exemplary issue categories may include Front Suspension, Rear Suspension, Turn Signal, Headlights, Air Bag, Brake System, Clutch, Engine, Transmission, Steering, Fuel System, Accelerator, Doors, Seats, Instrument Panel, Interior Lighting, Battery, Air Conditioning, Tires, etc. The issue category types provided may depend on the type of vehicle and vehicle equipment available to the occupant. A hierarchical menu may be provided which subcategories and/or sub elements are provided for selection once an issue category is selected. For example, selection of the Air Conditioning category may generate Heating and Cooling subcategories for occupant selection. In some embodiments, the Reporting Screen may allow for occupant entry of issue information, for example, using a keyboard, voice recognition, etc. For example, the Reporting Screen may request information entry by the occupant regarding events leading up to the issue, what the issue is and how frequently it occurs, and what is being done to correct the issue, if applicable. Any suitable information regarding the vehicle issue may be requested.

In some embodiments, the processing system 12 may provide menu options for selection by the occupant using the user interface 14 based on information provided by the issue detection system 15. For example, the issue detection system 15 may detect low tire pressure and a non-functioning turn signal. As a result, the processing system 12 may display the Tires and Turn Signal categories for selection by the occupant. The occupant may be able to select from the issue categories provided for reporting and then drill down to a specific menu item using the hierarchical menu. An Other or Show More category may be displayed that allows the user to select from additional categories, if desired.

Once the issue information is entered and/or selected by the occupant, the processing system 12 processes the information and may generate issue data that is capable of being communicated by the DCM 16 through the cellular network 18. While the processing system 12 is illustrated separate from the user interface 14, they may be part of the same component. In some embodiments, at step 38, the occupant is asked through the user interface 14 to which of the issue data receiving servers 22 and/or 24 is the issue data to be sent. For example, the issue data receiving server 22 may be associated with a government agency, such as the National Highway Traffic Safety Administration (NHTSA). The issue data receiving server 24 may be associated with a vehicle manufacturer. The occupant may select to provide the issue data to one or both of the issue data receiving servers 22 and/or 24. Selection data may be associated with the issue data that is machine-readable to indicate to which of the issue data receiving servers 22 and 24 to provide the issue data.

At step 40, the issue data and selection data are provided to the DCM 16 from the processing system 12. In some embodiments, the DCM 16 may provide the issue data and the selection data to the issue processing server 20 at step 44. The issue processing server 20 may save the issue data and the selection data in a local or remote database 42. The issue processing server 20 may include logic that determines which of the issue data receiving servers 22 and 24 to provide the issue data based on the selection data at step 46.

In some embodiments, the issue processing server 20 may include software that can be used to connect to webpages of websites provided by one or more of the issue data receiving servers 22 and 24. The software may include an autofill function that can be used to automatically populate fields with the issue data and submit forms including the populated fields. For example, at step 46 the issue processing server 20 may determine that the issue data is to be provided to the issue data receiving server 22. In this embodiment, the issue data receiving server 22 may provide the webpage for submitting the issue data, whose Internet address is known by the issue processing server 20. The issue processing server 20 may connect to the webpage for submitting the issue data and the issue processing server 20 may populate a form on the webpage with the issue data and submit the form. Similarly, at step 46 the issue processing server 20 may determine that the issue data is to be provided to the issue data receiving server 24. In this embodiment, the issue data receiving server 24 may provide the webpage for submitting the issue data, whose Internet address is known by the issue processing server 20. The issue processing server 20 may connect to the webpage for submitting the issue data and the issue processing server 20 may populate a form on the webpage with the issue data and submit the form. In some embodiments, the issue data receiving server 24 may function as the issue processing server 20.

The issue data receiving servers 22 and 24 may save the issue data in their respective databases 64 and 66. While the databases 64 and 66 are illustrated separate from the issue data receiving servers 22 and 24, they may be part of the servers 22 and 24. In some embodiments, one or both of the issue data receiving servers 22 and 24 may receive the issue data by means other than through a form submission. For example, the DCM 16 may connect directly to the issue data receiving servers 22 and/or 24 (i.e., without use of the issue processing server 20) via the cellular network 18 and provide the issue data thereto, which may be saved in their respective databases 64 and 66. In another embodiment, the issue data receiving servers 22 and 24 may receive the issue data from the issue processing server 20 through a network connection. In yet another embodiment, the issue data receiving servers 22 and 24 may be capable of exchanging the issue data with each other.

In some embodiments, at step 68, an advisor may monitor the issue data incoming to the issue data receiving server 24. Depending on the nature of the issue, the advisor may contact the vehicle occupant to assist with the particular issue. For example, the advisor may establish a voice connection with the vehicle occupant using the vehicle telematics. The advisor may then walk the occupant through instructions for resolving the issue. In some embodiments, the advisor may connect to the webpage of the issue data receiving server 22 to populate a form on the webpage with the issue data and submit the form. Whether the advisor provides the issue data to the issue data receiving server 22 may depend on, for example, the selection data provided by the vehicle occupant and/or other criteria, such as the issue type or outcome resulting from the issue occurance.

Figure 3:
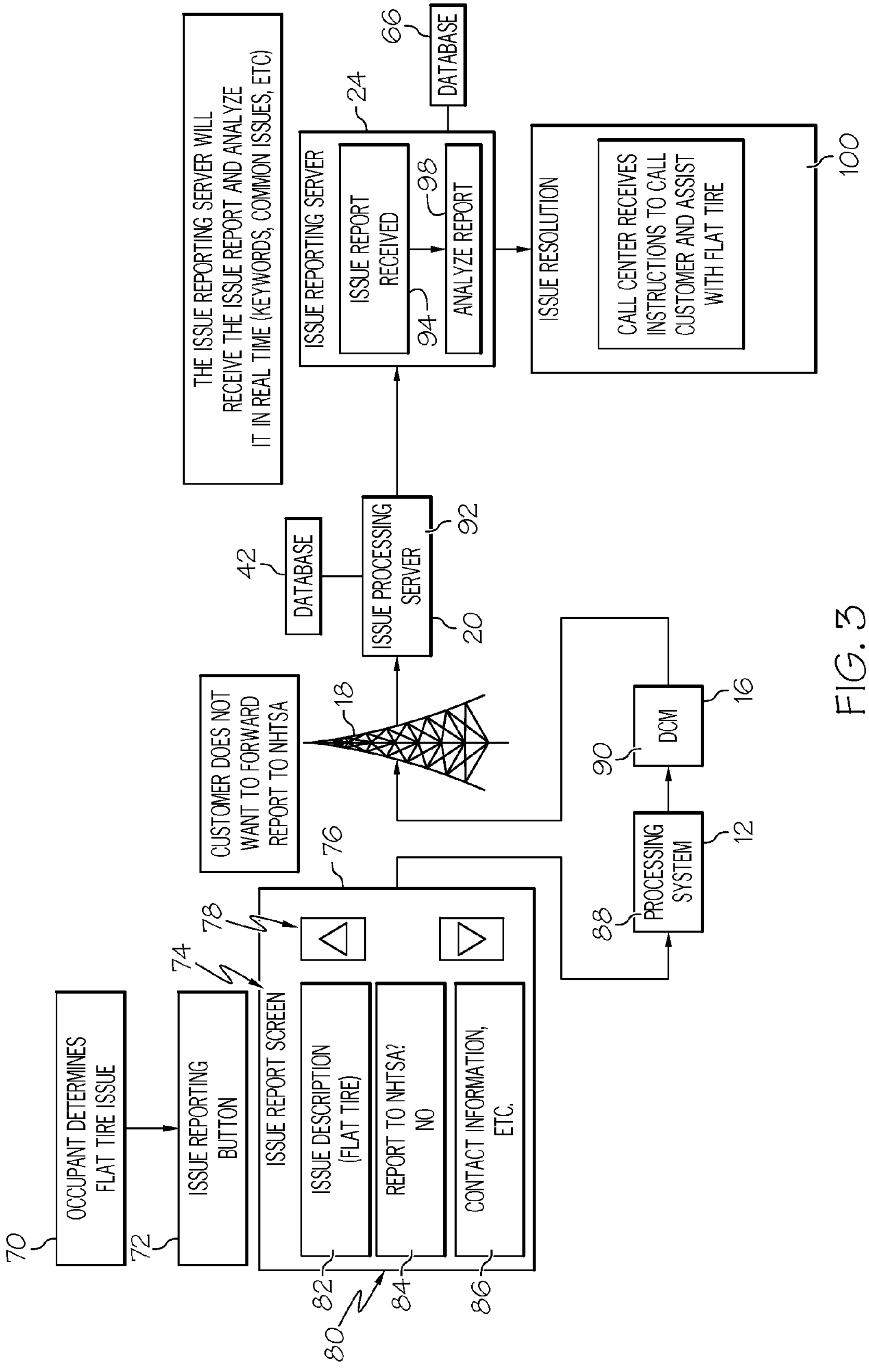
FIG. 3 illustrates a system and method of over-the-air reporting from a vehicle using a data communications module according to one or more embodiments shown and described herein.

Referring to FIG. 3, as an example, the vehicle occupant may determine that the vehicle has a flat tire at step 70. This determination may be made by the occupant alone, or may be made with the assistance of the issue detection system 15. At step 72, the vehicle occupant may actuate the Issue Reporting Button, which causes the user interface 14 to display an Issue Reporting Screen 74 at step 76. The Issue Reporting Screen 74 may include a scrolling tool 78 for scrolling through a number of Issue Reporting Buttons 80, including a Flat Tire Button 82. A report to NHTSA Button 84 and a Contact Entry Button 86 may also be displayed. The NHTSA Button 84 may be used to report the flat tire issue to a NHTSA issue data receiving server and the Contact Entry Button 86 may be used to provide the occupant's contact information, such as address, phone number, vehicle information, date, etc. In this example, the occupant does not wish to report the flat tire issue to the NHTSA. As one example, the occupant may wish to obtain instructions on how to change the flat tire. By default, actuating the Issue Reporting Button and proceeding with the reporting steps may provide the generated issue data to the manufacturer issue data receiving server 24. In other words, providing the generated issue data to the NHTSA issue data receiving server may be optional, while providing the generated issue data to the manufacturer issue data receiving server may be a default setting. In other embodiments, providing the generated issue data to the manufacturer issue data receiving server may also be optional. In still some embodiments, providing the generated issue data to the manufacturer issue data receiving server and the NHTSA issue data receiving server may be the default setting.

At step 88, once the issue information is entered and/or selected by the occupant, the processing system 12 processes the information and may generate issue data that is capable of being communicated by the DCM 16 through the cellular network 18. At step 90, the issue data (and selection data) are provided to the DCM 16 from the processing system 12. In some embodiments, the DCM 16 may provide the issue data to the issue processing server 20 at step 92. The issue processing server 20 may save the issue data in a local or remote database 42. The issue processing server 20 may include logic that determines which of the issue data receiving servers 22 and 24 to provide the issue data based on selection data.

At step 94, the issue processing server 20 may provide the issue data to the manufacturer issue data receiving server 24. The manufacturer issue data receiving server 24 may save the issue data in its database 66. At step 98, the manufacturer issue data receiving server 24 may analyze the issue data, for example, using keywords, common issues, etc. The issue data may then be reported to an advisor at step 100, who may then call or otherwise contact the vehicle occupant to assist with the flat tire issue.

Figure 4:
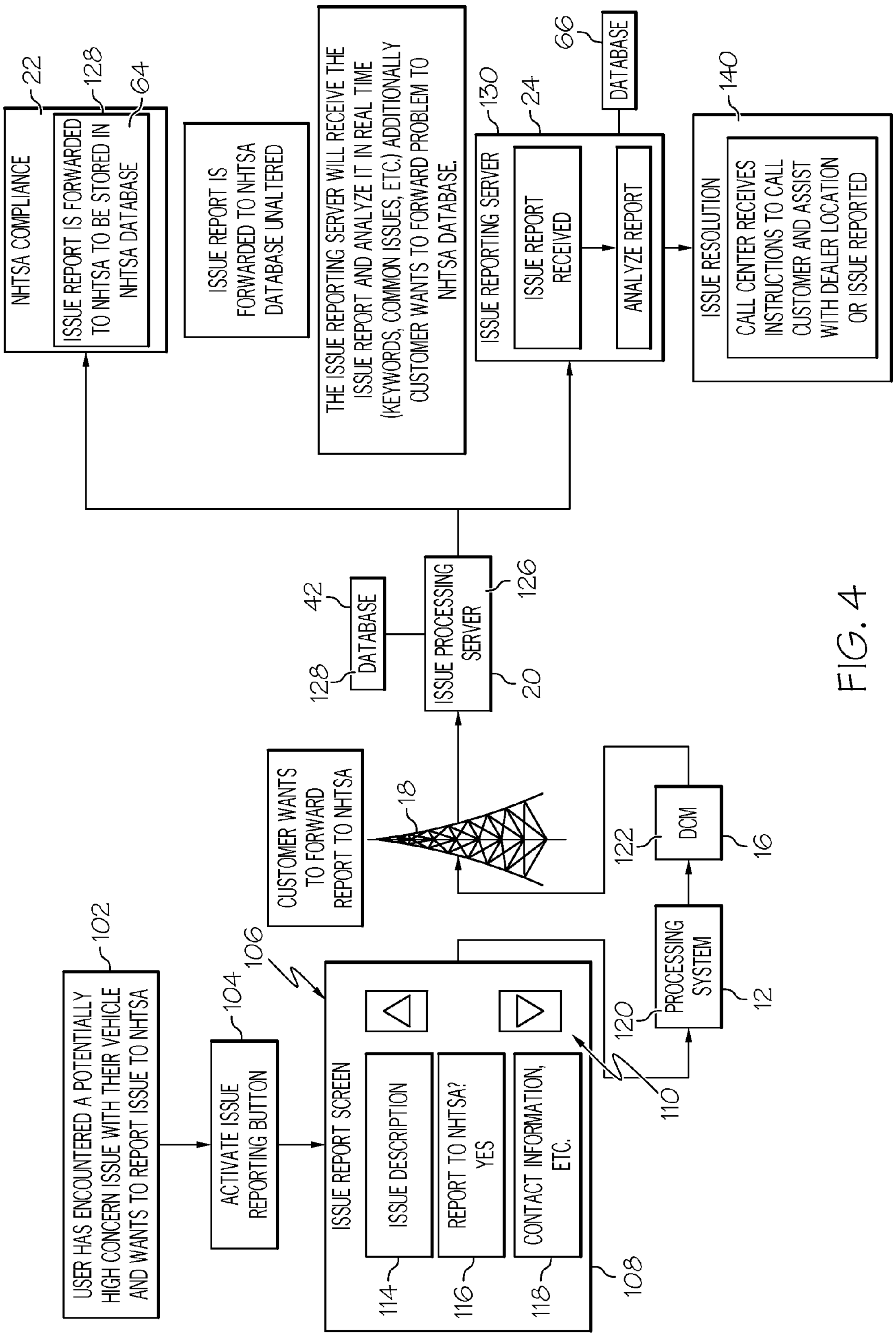
FIG. 4 illustrates another system and method of over-the-air reporting from a vehicle using a data communications module according to one or more embodiments shown and described herein.

Referring to FIG. 4, another example is illustrated where the vehicle occupant reports a vehicle issue to the NHTSA issue data receiving server 22 and to the manufacturer issue data receiving server 24. The vehicle occupant may determine that the vehicle has a potentially high concern issue with the vehicle at step 102. This determination may be made by the occupant alone, or may be made with the assistance of the issue detection system 15. At step 104, the vehicle occupant may actuate the Issue Reporting Button, which causes the user interface 14 to display an Issue Reporting Screen 106 at step 108. The Issue Reporting Screen 106 may include a scrolling tool 110 for scrolling through a number of Issue Reporting Buttons, including a button 114 having a description that matches the vehicle issue. A report to NHTSA Button 116 and a Contact Entry Button 118 may also be displayed. The NHTSA Button 116 may be used to report the issue to a NHTSA issue data receiving server and the Contact Entry Button 118 may be used to provide the occupant's contact information, such as address, phone number, vehicle information, date, etc. In this example, the occupant wishes to report the vehicle issue to the NHTSA. By default, actuating the Issue Reporting Button and proceeding with the reporting steps may also provide the generated issue data to the manufacturer issue data receiving server 24 without occupant selection.

At step 120, once the issue information is entered and/or selected by the occupant, the processing system 12 processes the information and may generate issue data that is capable of being communicated by the DCM 16 through the cellular network 18. At step 122, the issue data (and selection data) are provided to the DCM 16 from the processing system 12. In some embodiments, the DCM 16 may provide the issue data to the issue processing server 20 at step 126. The issue processing server 20 may save the issue data in a local or remote database 42. The issue processing server 20 may include logic that determines which of the issue data receiving servers 22 and 24 to provide the issue data based on selection data.

At step 128, the issue processing server 20 may provide the issue data to the NHTSA issue data receiving server 22. At step 128, the NHTSA issue data receiving server 22 may save the issue data in its database 64. As indicated above, the issue processing server 20 may include software that can be used to connect to webpages of websites provided by the NHTSA issue data receiving server 22. The software may include an autofill function that can be used to automatically populate fields with the issue data and submit forms including the populated fields. At step 130, issue processing server 20 may provide the issue data to the manufacturer issue data receiving server 24. The manufacturer issue data receiving server 24 may save the issue data in its database 66. The manufacturer issue data receiving server 24 may also analyze the issue data, for example, using keywords, common issues, etc. The issue data may then be reported to an advisor at step 140, who may then call the vehicle occupant to assist with the vehicle issue.

While the OTA reporting procedures may be initiated from the vehicle using the vehicle telematics, the OTA reporting procedures may be initiated from outside the vehicle, such as using a personal computer, hand-held device such as a cellular phone, etc. In some embodiments, the OTA reporting procedures may be performed within the vehicle where the cellular connection is provided by other cellular devices, such as a cellular phone, for example, which communicates with or replaces the DCM 16.

The above-described OTA reporting systems and methods may utilize a data communications module (DCM) in the vehicle that provides a connection to various issue receiving servers for collecting issue data, for example, through a cellular network. The DCM may provide issue data to the issue receiving servers OTA (e.g., without contacting a human advisor to provide the issue data). In some embodiments, the issue receiving servers may be associated with different organizations. For example, one issue receiving server may be associated with a government agency and another of the issue receiving servers may be associated with the vehicle manufacturer.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for occupant reporting of a vehicle issue over-the-air from within a vehicle, the system comprising:

a cellular device in the vehicle that establishes a connection with a cellular network;

a user interface including a display that provides occupant selectable menu options for reporting a vehicle issue;

a processing system that generates issue data based on a selected menu option; and an issue processing server that receives the issue data using the cellular network;

wherein the issue data is selectably provided to one or more issue receiving servers including a first issue receiving server associated with a first organization and a second issue receiving server associated with a second, different organization;

wherein the issue processing server includes software that connects to a website provided by at least one of the first and second issue receiving servers and automatically populates a field provided by the website with the issue data to submit the issue data.

2. The system of claim 1 further comprising an issue detection system within the vehicle, the issue detection system providing issue information to the processing system.

3. The system of claim 1, wherein the first issue receiving server is associated with a government agency and the second issue receiving server is associated with a vehicle manufacturer.

4. The system of claim 1, wherein the cellular device is a digital communications module.

5. The system of claim 1, wherein the cellular device is a portable cellular phone.

6. A method for occupant reporting of a vehicle issue over-the-air from within a vehicle, the method comprising:

establishing a connection with a cellular network using a cellular device in a vehicle;

selecting an issue menu option provided on a display of a user interface;

generating issue data based on the selected issue menu option;

providing the issue data to an issue processing server using the cellular network; and selectably providing the issue data to one or more issue receiving servers including a first issue receiving server associated with a first organization and a second issue receiving server associated with a second, different organization;

wherein the issue processing server connects to a website provided by at least one of the first and second issue receiving servers, the issue processing server automatically populating a field provided by the website with the issue data.

7. The method of claim 6 further comprising an issue detection system providing issue information to a processing system, the processing system generating the issue data.

8. The method of claim 6, wherein the first issue receiving server is associated with a government agency and the second issue receiving server is associated with a vehicle manufacturer.

9. The method of claim 6, wherein the cellular device is a digital communications module.

10. The method of claim 6, wherein the cellular device is a portable cellular phone.

11. A system for occupant reporting of a vehicle issue over-the-air from within a vehicle, the system comprising:

a cellular device in the vehicle that establishes a connection with a cellular network;

a user interface includes a display that provides an issue reporting screen where, upon occupant actuation of an issue reporting element, the issue reporting screen provides selectable menu options for reporting a vehicle issue;

a processing system that generates issue data based on an occupant selected menu option; and an issue processing server that receives the issue data using the cellular network;

wherein the issue data is provided to an issue receiving server;

wherein the issue processing server includes software that connects to a website provided by the issue receiving server and automatically populates a field provided by the website with the issue data to submit the issue data.

12. The system of claim 11, wherein the issue receiving server is a first issue receiving server associated with a first organization, the system further comprising a second issue receiving server associated with a second, different organization, wherein the issue data is selectably provided to one or both of the first and second issue receiving servers.

13. The system of claim 12, wherein the first issue receiving server is associated with a government agency and the second issue receiving server is associated with a vehicle manufacturer.

14. The system of claim 11 further comprising an issue detection system within the vehicle, the issue detection system providing issue information to the processing system.

* * * * *